(12) United States Patent
Halbower-Fenton et al.

(10) Patent No.: US 11,849,804 B2
(45) Date of Patent: Dec. 26, 2023

(54) KNIT ATHLETIC SHOES WITH CONTINUOUS UPPER PORTION

(71) Applicant: Allbirds, Inc., San Francisco, CA (US)

(72) Inventors: Lisa Halbower-Fenton, Scituate, MA (US); Jamie Sinclair McLellan, Sausalito, CA (US); Thomas Jad Finck, San Francisco, CA (US); Olivier Henrichot, Moraga, CA (US); James Romero, San Francisco, CA (US); Romesh Patel, Lafayette, CA (US)

(73) Assignee: ALLBIRDS, INC., San Francisco, CA (US)

( * ) Notice: Subject to any disclaimer, the term of this patent is extended or adjusted under 35 U.S.C. 154(b) by 72 days.

(21) Appl. No.: 16/859,807

(22) Filed: Apr. 27, 2020

(65) Prior Publication Data

US 2021/0330032 A1    Oct. 28, 2021

(51) Int. Cl.
A43B 23/02    (2006.01)
(52) U.S. Cl.
CPC ............................... *A43B 23/0205* (2013.01)
(58) Field of Classification Search
CPC .... A43B 23/0205; A43B 23/088; A43B 23/08
USPC ............................................................. 36/55
See application file for complete search history.

(56) References Cited

U.S. PATENT DOCUMENTS

| | | | | |
|---|---|---|---|---|
| 1,655,397 | A | * | 1/1928 | Horne ...................... A43B 9/08 36/55 |
| 2014/0237858 | A1 | | 8/2014 | Adami et al. |
| 2015/0250256 | A1 | * | 9/2015 | Podhajny ................. D04B 1/02 36/83 |
| 2017/0071290 | A1 | | 3/2017 | Follet et al. |
| 2018/0317592 | A1 | * | 11/2018 | Rudolf ..................... A43B 7/12 |
| 2020/0046074 | A1 | | 2/2020 | Berrian et al. |

FOREIGN PATENT DOCUMENTS

| | | | |
|---|---|---|---|
| CN | 106913006 | | 7/2017 |
| EP | 3124665 B1 | * | 10/2017 ............... D04H 1/42 |
| WO | WO-2014190402 A1 | * | 12/2014 ........... A43B 1/0045 |

OTHER PUBLICATIONS

EP 3124665 B1; Oct. 2017; Ren Christensen.*
EP 3124665 B1; Oct. 2017; Ren Christensen (Year: 2017).*

* cited by examiner

Primary Examiner — Alissa J Tompkins
Assistant Examiner — Catherine M Ferreira
(74) Attorney, Agent, or Firm — Brownstein Hyatt Farber Schreck, LLP

(57) ABSTRACT

A shoe may include various features to improve performance, increase manufacturing efficiency, and provide environmental benefits over traditional shoes. In some cases, a shoe includes an upper portion constructed from a continuous textile that includes multiple regions having different textile properties to improve the performance of the shoe, including durability and comfort. The upper portion may define a cuff region and a flex region adapted to expand to allow a wearer to put on the shoe and to contract to retain the shoe on the wearer's foot. The shoe may further include a heel retainer adapted to conform to a shape of the wearer's foot and retain the shoe on the wearer's foot. Eyelets of the shoe may be positioned along an external surface of the upper portion to improve comfort and simplify manufacturing.

19 Claims, 10 Drawing Sheets

KNIT ATHLETIC SHOES WITH CONTINUOUS UPPER PORTION

FIELD

Embodiments described herein relate to footwear, and in particular, to athletic shoes having features to increase wearers' athletic performance.

BACKGROUND

Shoes are widely used for protecting and providing comfort to wearers' feet. Traditional shoes include an upper portion that is formed by attaching multiple separate components together. In some cases, traditional shoes formed of bio-based materials, such as wool, are not designed to repel water and other contaminants. In some cases, traditional shoes are constructed entirely from synthetic materials, the production and use of which may be harmful to the environment and may prevent the shoes from being recycled. Many traditional athletic shoes use less environmentally friendly materials to achieve desired durability and foot support. In many cases, for example, soles for traditional athletic shoes that are stiffer or firmer to provide enhanced support may be constructed from materials that are not easily broken down for recycling or disposal.

SUMMARY

Certain embodiments described herein generally relate to, include, or take the form of a shoe that includes a sole and an upper portion. The sole may define a tread surface and a top surface opposite the tread surface. The upper portion may be attached to the top surface of the sole and may cooperate with one or more additional components of the shoe to define a cavity. The upper portion may include a cuff region at least partially surrounding an opening into the cavity and defining at least a portion of a perimeter of the opening. The cuff region may have a first elasticity. The upper portion may include a flex region having a second elasticity. The flex region and the cuff region may be configured to stretch to increase a size of the opening. The upper portion may further include a peripheral region at least partially surrounding the cuff region and the flex region. The peripheral region may have a third elasticity that is less than the first elasticity and the second elasticity. The flex region may be configured to pull the peripheral region against a wearer's foot to provide enhanced structural stability. The upper portion may be formed from a continuous textile comprising Eucalyptus fiber.

Other embodiments described herein may relate to a shoe that includes a sole defining a tread surface and a knit upper portion attached to the sole and defining a cavity. The knit upper portion may include a cuff region surrounding an opening into the cavity and defining at least a portion of the perimeter of the opening. The cuff region may include an elastic material. The shoe may further include a heel retainer positioned along an interior surface of the knit upper portion and protruding into the cavity. The heel retainer may be configured to conform to a wearer. The cuff region may be configured to exert an elastic force that draws the heel retainer against the wearer to retain the shoe on the wearer. The knit upper portion may be knit as a single, unitary piece Still other embodiments described herein may relate to a shoe that include an upper portion, a first set of eyelets, a second set of eyelets, and a shoelace. The upper portion may at least partially define a cavity. The upper portion may include a peripheral region extending around a perimeter of the upper portion and comprising a Eucalyptus fiber and a flex region at least partially surrounded by the peripheral region and comprising the Eucalyptus fiber and an elastic material. The first set of eyelets may be positioned along an exterior surface of the upper portion on a first side of the flex region. The second set of eyelets may be positioned along the exterior surface of the upper portion on a second side of the flex region opposite the first side. The shoelace may extend through one or more eyelets of the first set of eyelets and one or more eyelets of the second set of eyelets. The exterior surface of the upper portion may be defined by a continuous knit textile, and the flex region, the shoelace, the first set of eyelets, and the second set of eyelets may be configured to cooperate to tighten the shoe around a wearer's foot

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
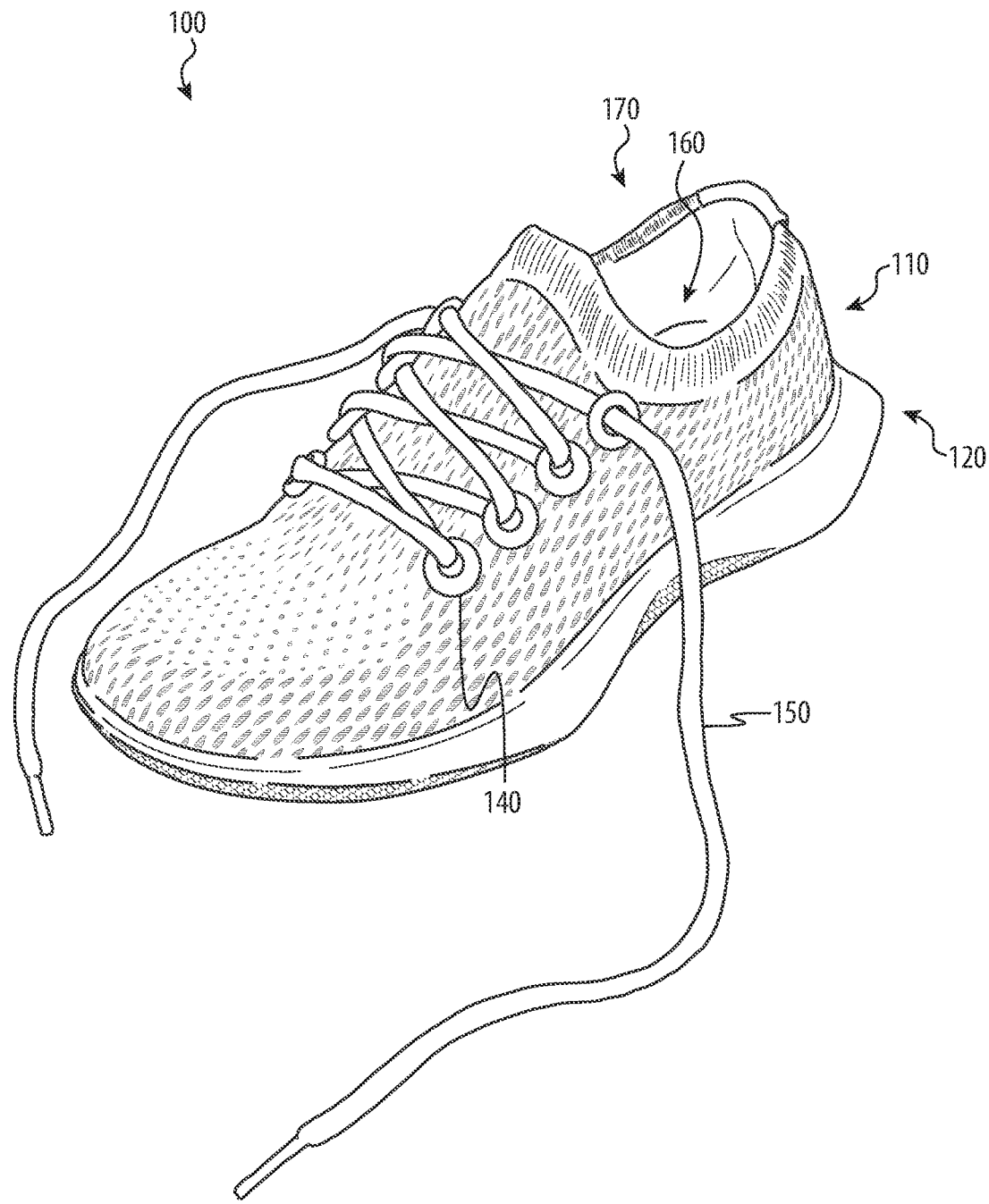
FIG. 1 illustrates an example shoe having a knit textile upper portion.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the claims.

The shoes described herein include various features to improve performance in strenuous or rapid activities like running and workouts, increase manufacturing efficiency, and provide environmental benefits over traditional shoes. In some cases, a shoe includes an upper portion (e.g., a knit upper portion) constructed from a continuous textile (e.g., a continuous knit textile) that includes multiple regions having different textile properties to improve the performance of the shoe, including enhanced support during athletic performance, enhanced durability and improved comfort.

The upper portion may cooperate with one or more additional shoe components to define a cavity for receiving a wearer's foot. The upper portion may define a continuous single exterior surface around an opening to the cavity with one seam and no holes through the knit textile forming the upper portion. This may help the shoe fit a wearer's foot more snuggly to improve support and general shoe performance during athletic activities.

The upper portion may define a cuff region adapted to extend at least partially around a wearer's foot or ankle during use to help to secure the shoe to the wearer's foot, which may improve the fit and comfort of the shoe, for example by reducing rubbing, shifting, or other problems associated with poor fit. The cuff region may at least partially surround the opening. In some cases, the cuff region extends at least partially around a perimeter of the opening. Additionally, the cuff region may define the opening and/or the perimeter. In some cases, the cuff region extends around an entirety of the perimeter of the opening. The textile properties for the cuff region may be selected to increase or otherwise enhance comfort, durability, and other textile characteristics. For example, the cuff region may have increased flexibility, elasticity, and breathability compared to other regions of the upper portion. The cuff region may give the shoe a snugger fit that reduces shifting by the shoe, relative to a foot, when a wearer engages is strenuous or rapid activity like running or a workout. The cuff region may be formed at least partially using a ribbed knit pattern that defines ribs along one or more surfaces of the cuff region.

As used herein, "elasticity" may refer to a measure of the ability or tendency of a material or combination of materials to elastically deform under an applied stress. Likewise, the term "elastically deform" may refer to the ability or tendency of a material to change size or shape under an applied stress (e.g., force) and return to substantially its initial size or shape after the applied stress is removed.

The upper portion may define a flex region in an area that generally extends over the top of a wearer's foot during use. The flex region may have increased flexibility, elasticity, and breathability compared to other regions of the upper portion. The cuff region may cooperate with one the flex region and/or the heel retainer to retain the shoe to a wearer's foot. Likewise, the cuff region and the flex region may stretch to allow a wearer's foot to enter the shoe, then contract to retain the shoe on the foot. This may provide extra tension on the wearer's foot during use of the shoes, for example to provide enhanced support and athletic performance during strenuous or rapid activities, such as running or exercising.

The shoe may include a heel retainer along an interior surface of the upper portion. The heel retainer may protrude into the cavity, and may define a recess between the heel retainer and the insole. The recess and the heel retainer may conform to a shape of a wearer's foot (e.g., the wearer's heel and/or heel bone) to retain the wearer's foot in the cavity and/or minimize the wearer's foot sliding or rubbing against the interior surface of the upper portion. Put another way, the wearer's heel can fit below the heel retainer, such that the heel retainer holds the heel in place or reduces heel motion when the wearer runs or engages in strenuous athletic activity.

The heel retainer may cooperate with one or more additional components of the shoe to retain the shoe on a wearer's foot, including the cuff region. The cuff region may exert an elastic force that draws the heel retainer against the wearer's foot to more effectively retain the shoe on the wearer's foot. The heel retainer may increase a comfort of the shoe by providing padding between the cuff region and sensitive portions of the wearer's foot or leg, including the areas around the Achilles tendon. This may avoid or reduce discomfort to the wearer resulting from the cuff region exerting an elastic force on the wearer. This may also provide enhanced support and stability to a wearer as the user engages in athletic activity, such as running or exercising.

The upper portion may define one or more peripheral regions at locations along the sides of the shoe. The peripheral regions may be stiffer or thicker than other regions to provide enhanced stability and support for a wearer, for example strenuous or rapid activities, such as running or exercising. The upper portion may define a toe region in an area that is generally over a wearer's toes during use. The toe region may be less prone to damage or deformation, for example because it is subject to lesser forces than other regions, such as the peripheral region. Accordingly, the textile properties for the toe region may be selected to increase or otherwise enhance comfort and other textile characteristics. For example, the toe region may have increased breathability and flexibility compared to the peripheral region and/or other regions.

The increased flexibility and/or elasticity of the cuff region and/or the flex region compared to other regions may help the wearer put on and take off the shoe. The cuff region and/or flex region may stretch to expand the opening into the cavity to help the wearer put on and take off the shoe. The increased elasticity of the cuff region and/or flex region additionally may improve the comfort and/or durability of the shoe by allowing the upper portion to return to its original shape after undergoing deformation, including deformation that occurs as a result of putting on and taking off the shoe and normal use (e.g., wear) of the shoe. This may prevent permanent deformation of the upper portion in the cuff region and/or flex region that may otherwise adversely affect the performance and comfort of the shoe.

The shoe may include eyelets positioned externally to the upper portion (e.g., along the exterior surface of the upper portion). In some cases, each eyelet is located completely outside of the upper portion. Said another way, no portion of any eyelet extends through, or is positioned beneath, any portion of the exterior surface of the upper portion. This allows the shoes to be manufactured without forming large holes in the upper portion; this may improve comfort and durability of the shoe. The shoe may include a shoelace passing through openings in the eyelets to retain the shoe to the wearer's foot. The shoelace may extend across the flex region and may be coupled to the upper portion by passing through one or more eyelets on opposing sides of the flex region. The shoelace may pull the eyelets together, compressing the flex region over the top of a wearer's foot and putting the sides of the shoe (e.g., the peripheral region)

under strain. This not only secures the shoe but also provides extra tension to the body of the wearer, thereby supporting the wearer's foot during activities like walking, running, working out, and the like.

In some cases, the shoes described herein may be constructed at least partially using bio-based materials. As used herein, the term "bio-based materials" may refer to materials made from substances derived at least partially from living or once-living organisms. The upper portion may include a bio-based material. Additionally or alternatively, other components of the shoes may include bio-based materials. For example, sole of the shoe may include a bio-based foam material made using sugarcane, the insole of the shoe may include a bio-based foam material made using castor bean oil, and the eyelets of the shoe may include a bio-based plastic made using castor oil. In some cases, the shoes described herein may be constructed at least partially using recycled materials. For example, a shoelace of the shoe may be constructed at least partially from recycled plastic bottles.

In various embodiments, the bio-based and recycled materials used in the shoes described herein provides significant environmental benefits over traditional shoes. Using bio-based materials as a substitute for synthetic materials may result in fewer harmful emissions associated with manufacturing the shoe by reducing or eliminating processing of harmful chemicals, such as the petroleum products used to manufacture most synthetic fibers. Similarly, bio-based materials are more ecologically sustainable than many synthetic materials because they are derived from renewable resources (e.g., plant fibers, sugarcane, corn sugar) rather than nonrenewable resources (e.g., petroleum products). Eucalyptus fiber is particularly environmentally friendly and sustainable, because Eucalyptus trees typically do not require irrigation or pesticides, and can be grown in areas that are not suitable for other farming uses. Similarly, using recycled materials instead of new materials reduces waste sent to landfills and incinerators and conserves natural resources, prevents pollution, and saves energy related to the collection and processing of new raw materials.

In addition to using bio-based and recycled materials, the shoes described herein may include various features to make recycling the shoes easier. For example, the shoe may have fewer components to separate from one another as part of the recycling process, for example as a result of upper portion being formed from a continuous textile.

In some cases, the shoe is designed to allow a wearer to wear the shoe without socks. In various embodiments, the shoe may include features to improve the performance of the shoe when worn without socks. The upper portion may improve the comfort of the shoe by reducing or eliminating seams that may irritate wearers, especially when lacking socks.

In various embodiments, the upper portion is attached to a first side of a sole that defines, on a second opposite side, a tread surface that is adapted to contact the ground or other surfaces while the shoe is worn. Additionally or alternatively, the sole may include one or more regions having different material properties that define the tread surface and are adapted to contact the ground or other surfaces while the shoe is worn. The sole may be attached to the upper portion, for example using an adhesive.

As used herein, "textile" or "fabric" may refer to a flexible material consisting of a network of natural and/or artificial fibers (e.g., yarn or thread formed into a sheet) formed by any suitable process, including, but not limited to, weaving, knitting, spreading, crocheting, knotting, felting, bonding, braiding, and carpeting.

As used herein, "textile properties" may refer to properties that define the dimensions and characteristics of a textile, including, but not limited to, fiber properties (e.g., fiber type, size, and length), yarn properties (e.g., yarn diameter, twist, weight, size, count, fiber content or fiber ratio, ply, and strand count in plied yarn), weight, thickness, fabric structure, fabric density, weave properties (e.g., weave type, warp and filling yarn count), knit properties (e.g., knit type, wale and course count), finishes or coatings (e.g., chemicals, resins, starches, and waxes), and mechanical effects (e.g., calendaring, napping, flocking, and brushing).

As used herein, "textile characteristics" may refer to measures of the textile's performance, including, but not limited to, stiffness (e.g., resistance to stretching or bending), flexibility (e.g., reduced stiffness), breathability (e.g., air permeability), water resistance, moisture wicking, odor resistance, durability characteristics, visual characteristics (e.g., textile appearance), and tactile characteristics (e.g., textile feel). As used herein, "water resistance" may refer to the ability of the shoe to prevent or reduce the entry of water, other liquids, or other contaminants into the cavity of the shoe and/or into other parts of the shoe. As used herein, "durability" may refer to the ability of materials (e.g., a textile) or objects (e.g., a shoe) to resist wear, deformation, and/or damage and/or to maintain its textile properties, structure, visual characteristics, and/or tactile characteristics. As used herein, "durability characteristics" may refer to measures of a textile's durability, including, but not limited to, abrasive strength (e.g., resistance to abrasion), bursting strength (e.g., ability to withstand forces applied at right angles to the plane of the fabric), and tensile strength (e.g., ability to withstand forces applied along the plane of the fabric).

FIG. 1 illustrates an example shoe 100 having a knit textile upper portion 110. The upper portion 110 may define a shape or structure of the shoe 100, and may be adapted to contain, comfort, and/or protect a foot of a wearer wearing the shoe 100. As described above, the shoe 100 may include an upper portion 110 constructed from a continuous textile (e.g., a knit textile) that defines multiple regions with different textile properties that may improve performance of the shoe, including durability and comfort. One or more textile properties may be varied across different regions of the upper portion 110 to achieve desired textile characteristics for each region to achieve desired shoe performance.

The multi-region upper portion 110 may improve the durability of the shoe 100, for example by having thicker or stiffer regions that are less susceptible to damage or deformation at locations prone to higher applied forces. Similarly, the multi-region upper portion 110 may improve the comfort of the shoe 100, for example by varying thickness and/or flexibility across different regions to better support or comfort the wearer's foot. The regions of the upper portion 110 are discussed in more detail below with respect to FIGS. 2-5.

Whereas many traditional shoes include upper portions formed from multiple different parts or components, in some cases, the upper portion 110 is formed from a continuous textile. The continuous textile may be formed as a single, unitary piece. The formation of the upper portion 110 using a continuous textile provides numerous advantages, including improving the comfort of the shoe 100 by removing seams that may irritate a wearer, and improving manufacturing efficiency by reducing the overall number of components in the shoe. The upper portion 110 may be formed at least partially using bio-based materials, such as Eucalyptus fiber, which is a more sustainable and environmentally friendly material than materials used in many traditional shoes. In addition, the upper portion 110 being constructed from a continuous textile reduces the use of potentially harmful chemicals, such as adhesives, used in the shoe 100.

In some cases, the upper portion 110 may include features to provide enhanced stiffness to support a wearer's foot during athletic activities. For example, the upper portion may include one or more regions with a stiffening material, such as a hot melt yarn, to improve the ability of the shoe 100 to support and/or stabilize a wearer's foot during running, exercising, or other athletic activities. Additionally or alternatively, the upper portion 110 may include one or more regions with increased fabric thickness to improve the ability of the shoe 100 to support and/or stabilize a wearer's foot during running, exercising, or other athletic activities.

In various embodiments, the continuous textile that is used to form the upper portion 110 may be constructed by any suitable process, including, but not limited to, weaving, knitting, spreading, crocheting, knotting, felting, bonding, braiding, and carpeting. In some cases, the continuous textile is a knit textile. The knit textile may be knit or otherwise formed into a particular shape (e.g., the shape of the upper portion 110 shown in FIGS. 3 and 4). In some cases, the continuous textile is knit into a three-dimensional shape (e.g., a non-planar shape). In some cases, the continuous textile is cut or otherwise formed into the proper shape after it is constructed. In various embodiments, different regions have different textile properties to achieve different textile characteristics.

The upper portion 110 may define a first part of an exterior surface of the shoe, and a sole 120 may define a second part of the exterior surface of the shoe. The upper portion 110 may cooperate with one or more additional shoe components to define a cavity 160 for receiving a wearer's foot (not shown in FIG. 1). Additionally, the upper portion 110 may define a first part of an interior surface of the shoe 100. The upper portion 110 may include one or more layers that are attached together. In some cases, multiple layers are formed together as part of a knitting process. The first and second layers may be interlaced with one another. For example, the knit structure of the first layer may be interlaced with the knit structure of the second layer, for example using the loop transfer technique.

In some cases, an outer layer of the upper portion 110 defines at least a portion of the exterior surface of the upper portion, and an inner layer of the upper portion defines at least a portion of the interior surface of the upper portion. In some cases, textile characteristics may vary between the interior surface and the exterior surface to achieve desired shoe performance. For example, a first layer may have a first knit structure having first textile properties and a second layer may have a second knit structure having second textile properties. Additionally, textile characteristics and materials may vary at different locations along the interior surface.

The continuous textile may be formed of any suitable material or combination of materials. For example, a woven or knit textile may be formed using one or more types of yarn. The yarn may be formed using one or more natural or synthetic fibers twisted or otherwise bound together. Example fibers include cellulose fibers (e.g., Eucalyptus fiber, bamboo fiber, rayon, and modal), wool, cotton, silk, polyester, nylon, and the like. In some cases, the yarn is formed using a blend of two or more fibers. For example, the yarn may be a blend of Eucalyptus fiber and polyester. In some cases, the yarn is a plied yarn that includes multiple strands of yarn twisted or braided together.

In some cases, the shoe 100 includes eyelets 140 and a shoelace 150 passing through the eyelets. Together they may retain the shoe 100 to the wearer's foot, for example by tightening the shoe 100 around the wearer's foot. The shoelace 150 may pull the eyelets 140 together, compressing the portions of the shoe 100 over the top of a wearer's foot (e.g., the flex region) and putting the sides of the shoe (e.g., the peripheral region) under strain or tension. This not only secures the shoe 100 to the wearer's foot but also provides extra tension to the body of the wearer, thereby supporting the wearer's foot during activities like walking, running, working out, and the like. In some cases, a flexibility of one or more layers of the upper portion 110 may enhance the ability for the shoe to support the wearer's foot. For example, an area over the wearer's foot may have more flexibility so that compression by the eyelets 140 and shoelace 150 may be more concentrated to the area over the wearer's foot to provide enhanced support and stability. The eyelets 140 and the shoelace 150 are discussed below in more detail with respect to FIG. 5A.

The shoe 100 may also include a sole 120 that defines a tread surface that is adapted to contact the ground or other surfaces while the shoe is worn. The sole 120 may be attached to the upper portion 110, for example using an adhesive. The sole 120 is discussed in more detail below with respect to FIG. 8.

Figure 2:
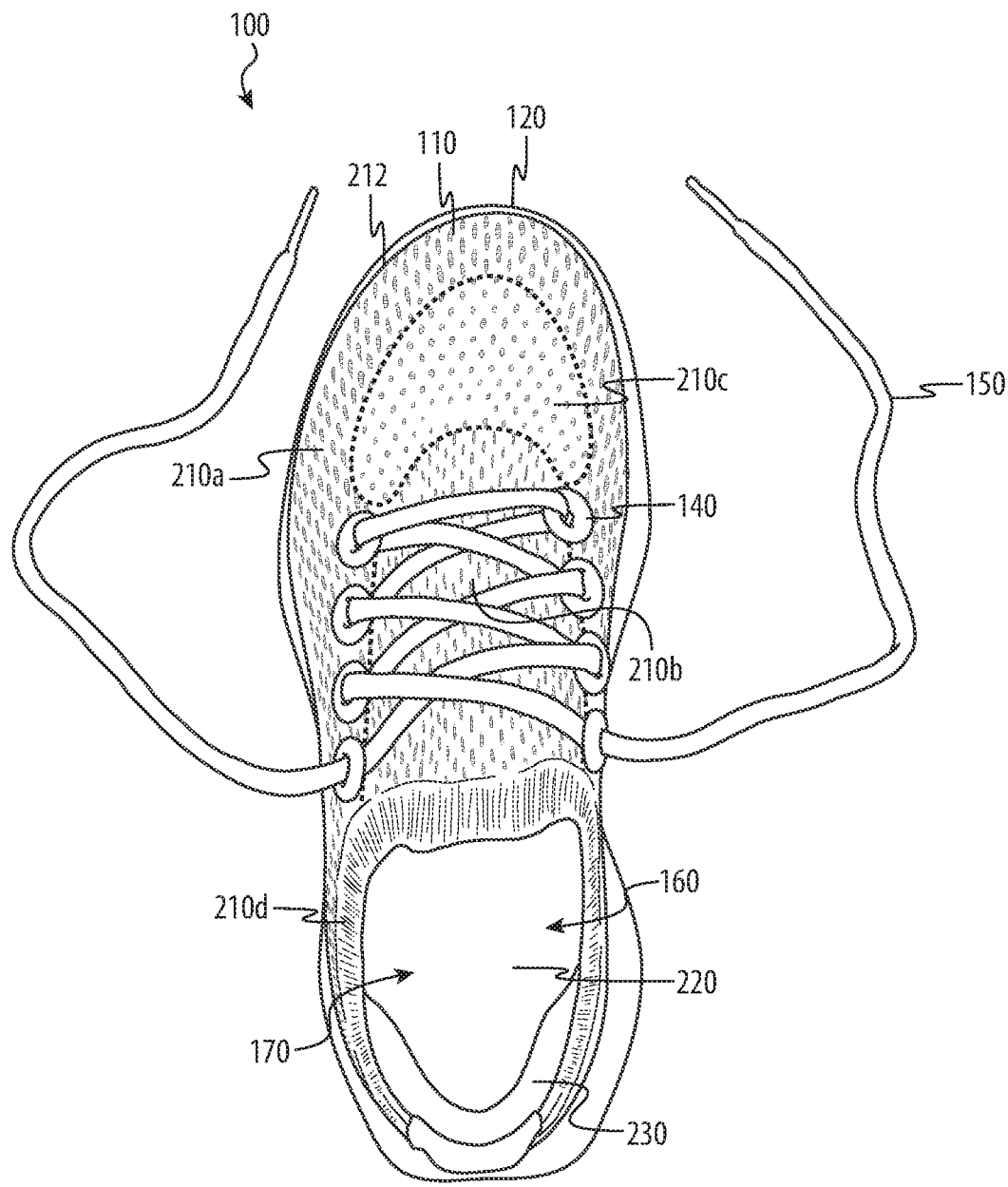
FIG. 2 illustrates a top view of the example shoe of FIG. 1.

FIG. 2 illustrates a top view of the example shoe 100. As discussed above, the upper portion 110 may be constructed from a continuous textile (e.g., a knit textile) that includes multiple regions having different textile properties to improve the performance of the shoe 100, including durability and comfort, and providing environmental benefits. The upper portion 110 of the example shoe 100 of FIG. 2 includes four regions: a peripheral region 210a, a flex region 210b, a toe region 210c, and a cuff region 210d. Each of the four regions 210a-d may have different textile properties. The different regions of the upper portion 110 cooperate to provide enhanced performance of the shoe 100 as a whole, including improved durability, comfort, and athletic performance.

In various embodiments, the multi-region upper portion 110 may improve the durability of the shoe 100, the comfort of the shoe, and/or allow a wearer to comfortably wear the shoe with or without socks. In some cases textile properties and/or textile characteristics, including textile thickness or flexibility, may be varied across the different regions 210a-d to achieve desired shoe performance. The locations, sizes, and textile properties of the regions 210a-d may be determined based on their positions with respect to the wearer's foot and/or their positions with respect to other components of the shoe 100. As one example, the peripheral region 210a may have increased stiffness and/or thickness compared to one or more of the other regions 210b-d and the flex region 210b and the cuff region 210d may have increased elasticity compared to the peripheral region 210a and/or the toe region 210c. This may improve the stability and support provided to a wearer by the shoe 100 during athletic activities such as running and exercising.

The upper portion 110 may define one or more peripheral regions 210a at locations along the sides of the shoe 100. The peripheral region 210a may be stiffer or thicker than other regions to provide enhanced stability and support for a wearer, for example strenuous or rapid activities, such as running or exercising. In some cases, the peripheral region 210a may correspond to locations that are more prone to damage or deformation, for example because they are subject to greater forces than other regions. For example, it may be desirable for a peripheral region 210a of the upper portion to have a higher stiffness, bursting strength, tensile strength, or abrasive strength compared to other regions.

The peripheral region 210a may extend along a perimeter 212 of the upper portion 110 where the upper portion meets the sole 120. The areas of the upper portion 110 near the perimeter 212 may be more prone to damage or deformation than other areas of the upper portion 110. For example, the areas near the perimeter 212 are closer to the ground than other areas of the upper portion 110. Similarly, the areas near the perimeter 212 are closer to the outer edge of the shoe 100 than other areas of the upper portion 110, and so objects may be more likely to contact these areas during wear. Additionally, the wearer's foot may cause the upper portion 110 to pull or twist against the sole 120 at the areas near the perimeter 212. As a result, these areas require a higher stiffness, abrasive strength, burst strength, and/or tensile strength than other areas of the upper portion 110. The upper portion 110 may include a stiffening material in the peripheral region 210a to increase stiffness, abrasive strength, burst strength, and/or tensile strength of the peripheral region 210a. For example, a yarn mixture for the peripheral region 210a may include a hot melt yarn (e.g., thermoplastic nylon yarn) to increase stiffness, abrasive strength, burst strength, and/or tensile strength of the peripheral region 210a.

In some cases, one or more peripheral regions 210a cooperate to extend entirely around the shoe 100 along the perimeter 212. In some cases, one or more peripheral regions 210a at least partially surround the flex region 210b, the toe region 210c, and/or the cuff region 210d.

The upper portion 110 may define a flex region 210b in an area that generally extends over the top of a wearer's foot during use. The flex region 210b may be less susceptible to damage or deformation than the peripheral region 210a, and textile properties for the flex region 210b may be selected to increase or otherwise enhance comfort, durability, and other textile characteristics. For example, the flex region 210b may have increased flexibility, elasticity, and breathability compared to other regions. The flex region 210b may provide extra tension on a wearer's foot during use of the shoe 100, for example to provide enhanced support and athletic performance during strenuous or rapid activities, such as running or exercising.

The flex region 210b may have an increased elasticity compared to other regions to help to secure the shoe 100 to the wearer's foot. The flex region 210b may exert a compressive force on the wearer's foot to hold the shoe on the wearer's foot and/or prevent the wearer's foot from inadvertently slipping out of the cavity 160, which may improve the comfort and durability of the shoe. The flex region 210b may stretch over the top of a wearer's foot, thereby putting the sides of the shoe 100 (e.g., the peripheral region 210a) under strain or tension. This not only secures the shoe 100 to the wearer's foot but also provides extra tension to the body of the wearer, thereby supporting the wearer's foot during activities like walking, running, working out, and the like. The flex region 210b may cause the peripheral region 210a to more securely engage a wearer's foot to provide lateral stability while preventing the shoe 100 from being overly restrictive to the wearer's ability to perform athletic activities such as running or exercising.

The increased flexibility and/or elasticity of the flex region 210b compared to other regions may help the wearer put on and take off the shoe 100. The flex region 210b may be capable of stretching to expand the opening 170 into the cavity 160 to help the wearer put on and take off the shoe 100. This may occur in conjunction with stretching of the cuff region 210d. The increased flexibility and/or elasticity of the flex region 210b compared to other regions may otherwise improve the comfort of the shoe 100, for example by more effectively conforming the shape of the upper portion 110 to the wearer's foot during use. The increased elasticity of the flex region 210b may additionally improve the comfort and durability of the shoe 100 by allowing the upper portion to return to its original shape after undergoing deformation, including deformation that occurs as a result of putting on and taking off the shoe and normal use (e.g., wear) of the shoe. This may prevent permanent deformation of the upper portion 110 in the flex region 210b that may otherwise adversely affect the performance and comfort of the shoe 100.

The upper portion 110 may include an elastic material in the flex region 210b to increase the elasticity and/or flexibility of the flex region 210b. For example, a yarn mixture for the flex region 210b may include an elastic polymer (e.g., elastane) to increase the elasticity and/or flexibility of the flex region 210b. The flex region 210b, or a portion thereof, may be positioned between rows of eyelets 140 on each side of the shoe 100. The flex region 210b may be at least partially surrounded by the peripheral region 210a, the toe region 210c, and/or the cuff region 210d. The peripheral region 210a, the toe region 210c, and the cuff region 210d may cooperate to completely surround the flex region 210b, as shown in FIG. 2.

In some cases, the weave density of one or more layers that form the flex region 210b may allow the flex region to be more flexible to improve the ability of the flex region to support a wearer's foot. In some cases, an outer layer of the flex region 210b may have a lower weave density that allows it to stretch and/or contract more than other regions, including the peripheral region 210a.

The upper portion 110 may define a toe region 210c in an area that is generally positioned over a wearer's toes during use. The toe region 210c may be less prone to damage or deformation, for example because it is subject to lesser forces than other regions, such as the peripheral region 210a. Accordingly, the textile properties for the toe region 210c may be selected to increase or otherwise enhance comfort and other textile characteristics. For example, the toe region 210c to have increased breathability and flexibility compared to the peripheral region 210a and/or other regions. The location of the toe region 210c over a wearer's toes combined with the fact that the location is less prone to damage or deformation than other locations, may make the flex region well-suited to be more breathable to vent heat from the wearer's foot to make the wearer more comfortable. For example, the toe region 210c may not include the stiffening material that is present in the peripheral region 210a, which may result in the toe region being more breathable than the peripheral region 210a.

The upper portion 110 may define a cuff region 210d that extends at least partially around the opening 170 into the cavity 160. In some cases, the cuff region 210d extends entirely around the opening 170. The cuff region 210d may extend at least partially around a wearer's foot or ankle during use to help to secure the shoe 100 to the wearer's foot, including during athletic activities. This may improve the fit and comfort of the shoe, for example by reducing rubbing, shifting, or other problems associated with poor fit, and may improve athletic performance by improving stability and support while allowing for flexibility. The cuff region 210d may engage a wearer's ankle to provide enhanced lateral stability and support while not being overly restrictive to movement. The textile properties for the cuff region 210d may be selected to increase or otherwise enhance comfort, durability, and other textile characteristics. For example, the cuff region 210d may have increased flexibility, elasticity, and breathability compared to other regions, including the peripheral region 210a and the toe region 210c.

The cuff region 210d may have an increased elasticity compared to other regions of the upper portion 110 so that the cuff region may exert a compressive force on the wearer's foot or leg to hold the shoe 100 on the wearer's foot and/or prevent the wearer's foot from inadvertently slipping out of the cavity 160. This may improve the comfort and durability of the shoe. The cuff region 210d may engage a wearer's leg around the wearer's ankle to provide enhanced lateral stability and support while not being overly restrictive to movement.

Similar to the flex region 210b, the increased flexibility and/or elasticity of the cuff region 210d compared to other regions may help the wearer put on and take off the shoe 100. The cuff region 210d may be capable of stretching to expand the opening 170 into the cavity 160 to help the wearer put on and take off the shoe 100. This may occur in conjunction with stretching of the flex region 210b. The increased flexibility and/or elasticity of the cuff region 210d compared to other regions may otherwise improve the comfort of the shoe 100, for example by more effectively conforming the shape of the upper portion 110 to the wearer's foot during use. The increased elasticity of the cuff region 210d may additionally improve the comfort and durability of the shoe 100 by allowing the upper portion to return to its original shape after undergoing deformation, including deformation that occurs as a result of putting on and taking off the shoe and normal use (e.g., wear) of the shoe. This may prevent permanent deformation of the upper portion 110 in the cuff region 210d that may otherwise adversely affect the performance and comfort of the shoe 100.

The upper portion 110 may include an elastic material in the cuff region 210d to increase the elasticity and/or flexibility of the cuff region 210d. In some embodiments, the cuff region may be formed entirely from a knit elastic polymer (e.g., elastane). In other embodiments, a yarn mixture for the cuff region 210d may include an elastic polymer (e.g., elastane) or other elastic material to increase the elasticity and/or flexibility of the cuff region 210d, along with other materials, such as recycled polyester.

As noted above, the shoe 100 may define a cavity 160 adapted to receive a wearer's foot. In some cases, an insole 220 may be positioned in the cavity, and may define at least a portion of the interior surface of the shoe 100 that surrounds the cavity 160. For example, the insole 220 may define a foot bed configured to receive and contact a bottom surface of a foot of the wearer. The insole 220 may be adapted to be positioned between the wearer's foot and the sole 120 to cushion the wearer's foot during wear. The insole 220 may cooperate with the upper portion 110 and one or more additional components of the shoe 100 to define the interior surface of the shoe 100.

In various embodiments, the insole 220 may include a top surface defining a portion of the interior surface of the shoe 100 and a bottom portion that provides cushioning to the wearer's foot. The top surface may be formed of any suitable material or combination of materials, including Eucalyptus fiber, polyester, wool, cotton, nylon, and the like. In some cases, the top surface is formed of a combination of Eucalyptus fiber and recycled polyester. The bottom portion may be formed of any suitable material or combination of materials, including polyamides, polyethylene, polypropylene, polyurethane (e.g., thermoplastic polyurethane), ethyl vinyl acetate, and polyols. In some cases, the bottom portion is formed at least partially from a bio-based material, such as castor bean oil. As noted above, using bio-based materials may provide environmental benefits, including reduced emissions and ecological sustainability.

The shoe 100 may include a heel retainer 230 along an interior surface of the upper portion 110. The heel retainer 230 may protrude into the cavity 160, and may define a recess between the heel retainer 230 and the insole 220. The recess and the heel retainer 230 may conform to a shape of a wearer's foot (e.g., the wearer's heel and/or heel bone) to retain the wearer's foot in the cavity 160 and/or minimize the wearer's foot sliding or rubbing against the interior surface of the upper portion 110. The heel retainer 230 may cooperate with one or more additional components of the shoe 100 to retain the shoe on a wearer's foot, including the cuff region 210d. The heel retainer 230 is discussed in more detail below with respect to FIG. 6.

Figure 3:
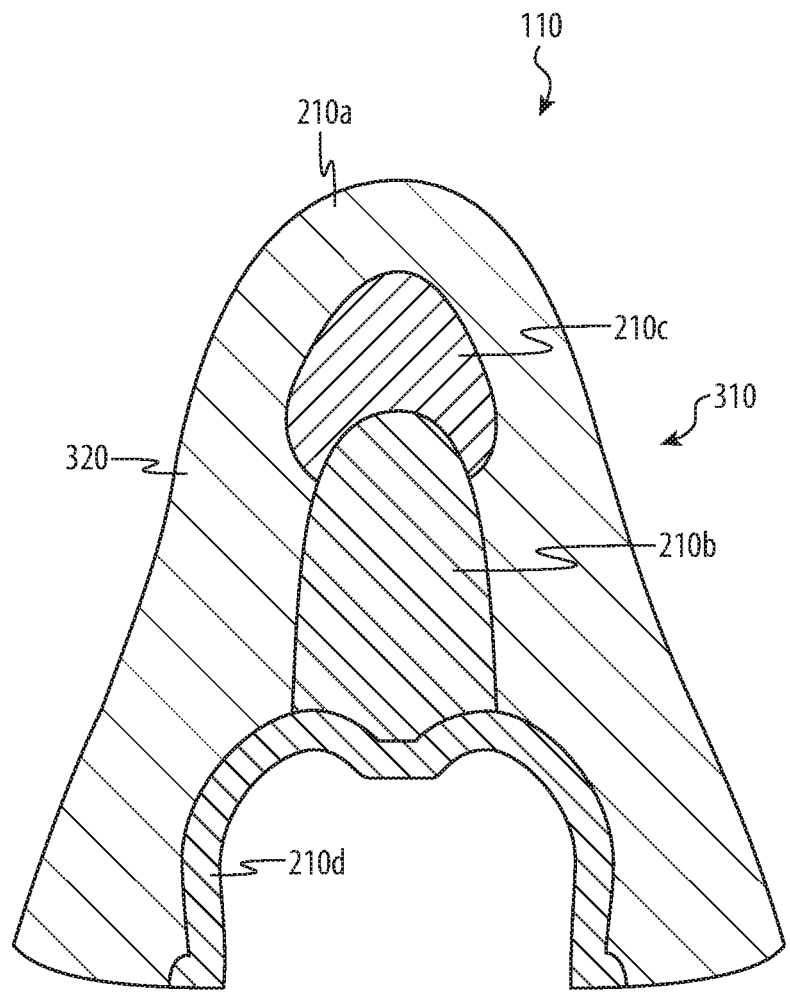
FIG. 3 illustrates an outer layer of the upper portion of the example shoe of FIG. 1.
Figure 4A:
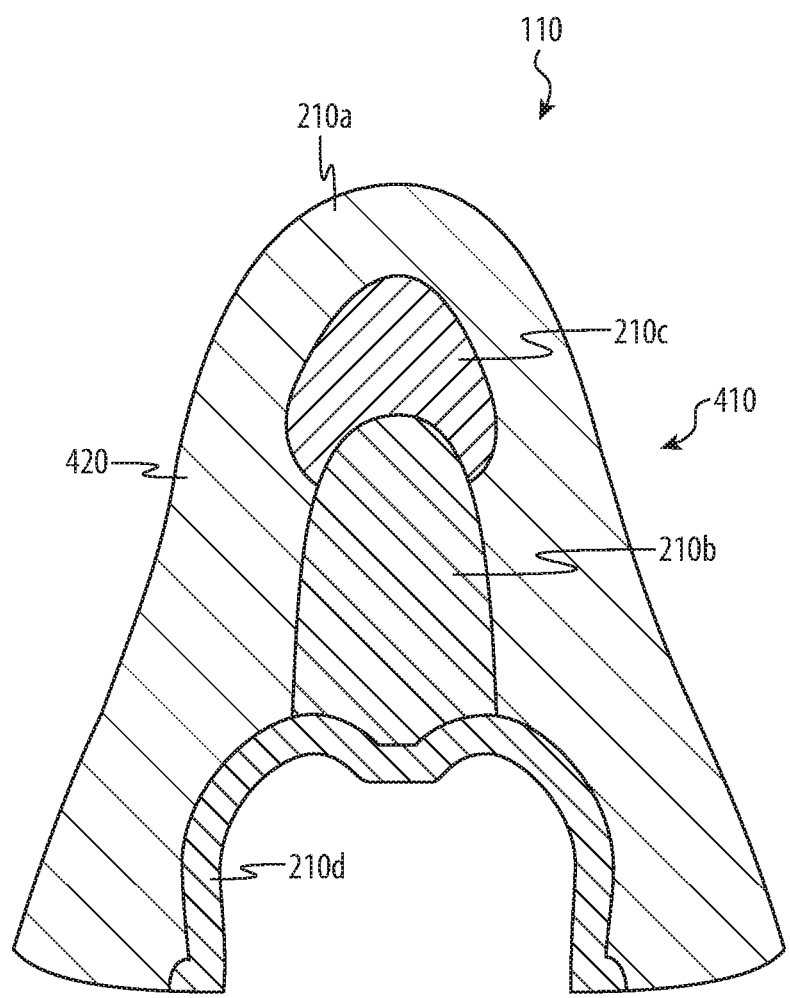
FIG. 4A illustrates an inner layer of the upper portion of the example shoe of FIG. 1.

As discussed above, the upper portion 110 may be formed from a continuous textile, and the upper portion 110 may include multiple layers. FIGS. 3 and 4 illustrate the example knit textile upper portion 110 as a continuous textile in a pre-assembly configuration. FIGS. 3 and 4A illustrate the different regions 210a-d of the upper portion 110. FIG. 3 illustrates the outer layer 310 of the upper portion 110 that defines at least a portion of an exterior surface 320 of the upper portion 110. FIG. 4A illustrates the inner layer 410 of the upper portion 110 that defines at least a portion of an interior surface 420 of the upper portion 110.

In various embodiments, desired textile characteristics for each region, including flexibility, stiffness, elasticity, breathability, bursting strength, tensile strength, and abrasive strength may be achieved by selecting textile properties that yield the desired textile characteristics.

In some cases, as noted above, the textile properties may be different in different layers of the upper portion 110 and/or in different regions of the upper portion 110. For example, types and amounts of yarn used in each region and each layer may vary. With reference to FIG. 3, the peripheral region 210a in the outer layer 310 may include a yarn comprising a mixture of man-made fiber (e.g., polyester) and a bio-based fiber (e.g., Eucalyptus fiber) and a yarn comprising a thermoplastic material. For example, in some cases, the peripheral region 210a in the outer layer 310 includes a first yarn that is plied or pre-twisted yarn having three strands comprising polyester and Eucalyptus fiber (e.g., TENCEL) and a second yarn formed of thermoplastic nylon.

In some cases, the content of the first yarn may be between 60% and 80% Eucalyptus fiber (e.g., TENCEL) and between 20% and 40% polyester. For example, the content of the first yarn may be 70% Eucalyptus fiber and 30% polyester. This blend of fibers in a yarn may provide advantages, including a desired textile feel, bursting strength, abrasive strength. In some cases, the blend of fibers may be increased or otherwise enhanced to balance absorption and distribution of moisture. In some cases, the Eucalyptus fiber may absorb or distribute moisture across an area of the textile, and the polyester may wick moisture to cause it to be evaporated. In some cases, the thermoplastic nylon may increase a stiffness and/or abrasive strength of the peripheral region 210a in the outer layer 310.

The flex region 210b and the toe region 210c in the outer layer 310 may include the first yarn discussed above. In some cases, the flex region 210b and the toe region 210c do not include a thermoplastic material, which contributes to increased flexibility (reduced stiffness) and breathability as compared to the peripheral region 210a.

In some cases, one or more regions 210a-d may only include a single layer that defines both the interior surface 420 and the exterior surface 320 of the upper portion 110. In some cases, the cuff region 210d may only include a single layer formed from a third yarn that includes knit elastic material (e.g., elastane). The third yarn may contribute to an increased flexibility and/or elasticity of the cuff region 210d. In some cases, the third yarn may further include nylon or another material in addition to the knit elastic material. The cuff region 210d may be attached to one or both of the outer layer 310 or the inner layer 410. In some cases, the cuff region 210d is continuously knit with the flex region 210b and/or the peripheral region 210a. In some cases, the weave density of one or more layers that form the flex region 210b may allow the flex region to be more flexible to improve the ability of the flex region to support a wearer's foot. In some cases, an outer layer of the flex region 210b may have a lower weave density that allows it to stretch and/or contract more than other regions, including the peripheral region 210a.

With reference to FIG. 4A, the peripheral region 210a and the toe region 210c in the inner layer 410 may include the first yarn discussed above and a fourth yarn having 2 strands of solid yarn comprising polyester and Eucalyptus fiber. In some cases, the third yarn comprises the same content of Eucalyptus fiber and polyester as the first yarn discussed above. The flex region 210b in the inner layer 410 may include the first yarn, the third yarn, and the fourth yarn. The third yarn may contribute to an increased flexibility and/or elasticity of the cuff region 210d. In some cases, the outer layer 310 and/or the inner layer 410 of the flex region 210b may have a knit pattern that differs from the other regions of the upper portion. The knit pattern may allow the flex region 210b to stretch more than the peripheral region 210a or the toe region 210c.

In various embodiments, different materials and techniques may be used to achieve desired textile characteristics. In some cases, varying a thickness (e.g., distance from the interior surface 420 to the exterior surface 320) and/or density (e.g., amount of yarn per area) of the upper portion 110 across different regions can be used to achieve desired textile characteristics. For example, in some cases, a first region (e.g., the peripheral region 210a) of the upper portion 110 having a first thickness may have an increased stiffness, a higher bursting strength, a higher tensile strength, and/or a higher abrasive strength compared to a second region (e.g., the toe region 210c) having a second thickness less than the first thickness. Similarly, in some cases, a first region (e.g., the peripheral region 210a) of the upper portion 110 having a first density may have an increased stiffness, a higher bursting strength, a higher tensile strength, and/or a higher abrasive strength compared to a second region (e.g., the toe region 210c) having a second density less than the first density.

The thickness and/or density of a region of the upper portion 110 may be determined by a thickness of fibers in the yarn used in the region, a thickness of strands of yarn used in the region, a number of plied or braided yarn strands in a plied yarn, a density of the knit pattern in the region, and the like. Accordingly, a first region of the upper portion 110 having a first thickness may have thicker fibers, thicker yarn, and/or a denser knit pattern compared to a second, less thick region. Similarly, a first region of the upper portion 110 having a first density may have thicker fibers, thicker yarn, and/or a denser knit pattern compared to a second, less dense region.

Whereas a thicker and/or denser region of the upper portion 110 may be stiffer, have a higher bursting strength, a higher tensile strength, and/or a higher abrasive strength, a thinner and/or less dense region of the upper portion 110 may be more breathable (e.g., have a higher air permeability) and/or more flexible. As such, some regions of the upper portion 110 may be thinner and/or less dense to achieve flexibility and breathability, which may improve the comfort of the shoe 100 by allowing moisture evaporation from the wearer's foot.

In some cases, the types of fibers and fiber ratio (e.g., the ratio of different fibers) in a yarn and/or a yarn type may vary across different regions of the upper portion 110 to change a thickness and/or achieve desired textile characteristics, including tactile characteristics and durability characteristics. For example, a first region may include a first yarn having a first blend of fibers at a first ratio and a second region may include a second yarn having a second blend of fibers at a second ratio. In some cases, plied yarns and/or multiple yarns are used in the same region. Plied yarns include multiple strands of yarn that are twisted or braided together to create a thicker yarn.

In some cases, one or more regions (e.g., the peripheral region 210a) of the upper portion 110 include a thermoplastic material that is heated during the manufacturing process to change the textile characteristics within the regions. In some cases, the yarn used in one or more regions of the upper portion 110 include a coating (e.g., resin) or one or more fibers formed of a thermoplastic material. In some cases a film that includes a thermoplastic material is applied to one or more regions as part of the manufacturing process. The region may be heated as part of the manufacturing process, for example after the upper portion is constructed, to change textile characteristics of the region. The regions may be heated during the manufacturing process to activate (e.g., melt) the thermoplastic material to bond the thermoplastic material to the other materials in the regions and change the textile characteristics of the regions. In some cases, the thermoplastic material increases a stiffness, abrasive strength, burst strength, and/or tensile strength of the region(s) to which it is applied. For example, in some cases, the thermoplastic materials may help to resist forces applied by the shoelace 150 to reduce stretching of the peripheral region 210a. Example thermoplastic materials include ethylene vinyl acetates (EVAs), polyamides, polyesters, and polyurethanes.

In some embodiments, the thermoplastic material, when melted, may fill spaces between loops within the knit pattern of the upper portion 110. In some cases, the thermoplastic material, when melted, may coat and/or be absorbed into the yarn and/or fibers forming the knit textile. Once the knit textile is cooled, the textile properties of the region(s) containing the thermoplastic material may differ from those other regions of the shoe 100. For example, the thermoplastic material may reduce bending or stretching of the knit textile to increase a stiffness, tensile strength, and or burst strength of the material. Similarly, the thermoplastic material may bond to, coat, or otherwise form a barrier around the textile and/or the yarn or fibers within the textile to prevent abrasion or other damage. In various embodiments, the thermoplastic material may not substantially change an appearance of the knit textile. For example, the thermoplastic material may not be visible once it has been melted into the knit textile. The thermoplastic material may be designed to melt or flow at temperatures above normal environmental temperatures, but below where the other materials in the upper portion 110 would scorch or burn.

In some cases, the upper portion 110 is heated to a temperature between 220 degrees Celsius and 300 degrees Celsius to activate (e.g., melt) the thermoplastic material, for example using a steam iron. Once the upper portion 110 cools to a temperature between 150 degrees Celsius and 220 degrees Celsius, the thermoplastic material is integrated into the upper portion, and the upper portion may be heated to a temperature between 200 degrees Celsius and 220 degrees Celsius without re-melting the thermoplastic material or causing the textile properties of the upper portion to be further changed.

In some cases, the border between regions having different textile properties may be a distinct border in which the textile properties transition across a relatively small distance (e.g., 0.5 mm-1 mm) or a gradual border in which the textile properties change across a relatively long distance (e.g., 1 mm-10 mm). In either case, the border may be visible or invisible. In some cases, different textile properties may change across different distances depending on a location of the border or other factors.

Figure 4B:
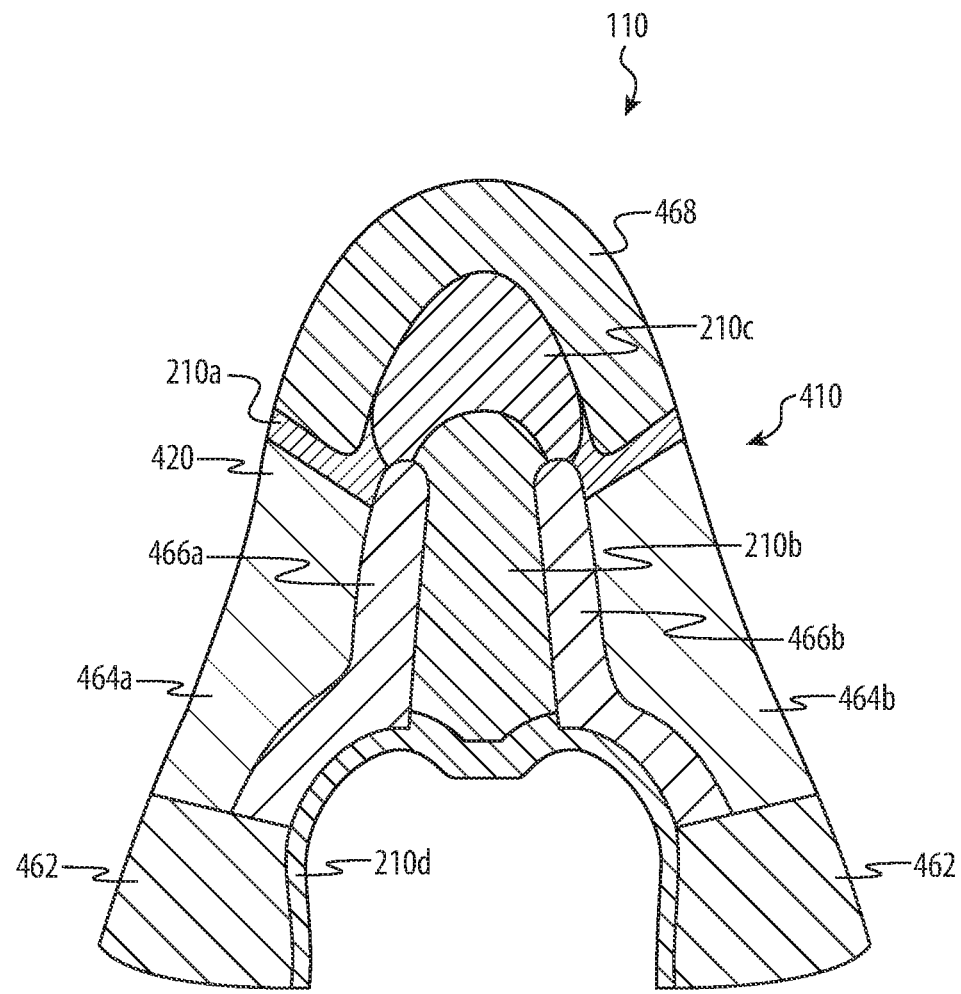
FIG. 4B illustrates the inner layer of FIG. 4A with components attached to the inner layer that define at least a portion of the interior surface of the upper portion of the example shoe of FIG. 1.

In various embodiments, the upper portion 110 may include one or more components attached to the inner layer 410 and/or the outer layer 310 and/or disposed between the layers 310, 410. The components may improve the comfort, structural stability, and/or performance of the shoe 100. FIG. 4B illustrates the inner layer 410 of the upper portion 110 with components attached to the inner layer 410 that define at least a portion of the interior surface 420 of the upper portion. The components may include a heel lining 462, lateral reinforcement components 464a, 464b, midfoot linings 466a, 466b, and a toe reinforcement component 468.

The heel lining 462 may extend around a rear portion of the interior surface 420 of the upper portion 110. The heel lining 462 may reduce wear of the upper portion 110 and/or provide friction to retain the wearer's foot in the shoe during wear. In some cases, the heel lining 462 extends across and covers a seam that attaches the upper portion 110 to itself to improve the comfort of the shoe 100. For example, the heel lining 462 may prevent the seam from rubbing or otherwise irritating the wearer's foot, including a wearer wearing the shoe 100 without a sock. The heel lining 462 may form at least a portion of the heel retainer 230 discussed herein. For example, heel padding that forms a shape of the heel retainer 230 may be positioned between the heel lining 462 and the inner layer 410, and the heel liner 426 may cover the padding. The heel lining 462 may be formed from a wear-resistant material (e.g., wool, polyester, or the like) that is attached (e.g., sewn or glued) onto the interior surface 420 of the upper portion 110.

The lateral reinforcement components 464a, 464b may be positioned along sides of the upper portion 110, and may increase a stiffness of these regions of the upper portion 110 to improve the lateral stability for a wearer of the shoe 100. The lateral reinforcement components 464a, 464b may extend along medial and lateral portions of a midfoot of a wearer of the shoe 100. The toe reinforcement component 468 may be positioned in a toe region of the shoe 100, and may increase a stiffness of this region of the upper portion 110 to help to define the toe box of the shoe and/or protect the inner layer 410 from damage caused by the wearer's toes contacting the inner layer 410.

The lateral reinforcement components 464a, 464b may extend from the eyelets 140 to a perimeter of the upper portion 110, and may maintain a shape and/or position of the upper portion 110 relative to other components of the shoe 100, for example by preventing or reducing stretching of the peripheral region 210a. This may provide longitudinal support for a wearer's foot in the shoe. For example, the lateral reinforcement components 464a, 464b may prevent or reduce the wearer's foot moving toward the front or toward the back of the shoe 100 during wear. This may facilitate proper running technique and/or provide additional comfort. Additionally, this may increase a durability of the shoe 100, for example by reducing or preventing repetitive forces on the toe region of the upper portion that may result in fatigue breaking or bursting of the yarns that form that region.

The lateral reinforcement components 464a, 464b and the toe reinforcement component 468 may be attached to the inner layer 410 by any suitable technique. In some cases, the lateral reinforcement components 464a, 464b and/or the toe reinforcement component 468 are laminated to the inner layer 410. The lateral reinforcement components 464a, 464b and/or the toe reinforcement component 468 may be formed of any suitable material or combination of materials, including natural and manmade materials. In some cases, the lateral reinforcement components 464a, 464b and/or the toe reinforcement component 468 are formed of microsuede or similar material(s) that serve the functions discussed herein while being comfortable to a wearer of the shoe 100, including a wearer wearing the shoe without a sock.

The midfoot linings 466a, 466b may be positioned in a central region of the upper portion 110, and may reduce wear of the upper portion 110 and/or improve the comfort of the shoe 100, including for a wearer wearing the shoe 100 without a sock. The midfoot linings 466a, 466b may be positioned over stitches along the inner layer 410, including stitches attaching the eyelets 140 to the upper portion 110 as discussed below with respect to FIG. 5A. The midfoot linings 466a, 466b may be attached to the inner layer 410 by any suitable technique. In some cases, midfoot linings 466a, 466b are stitched, glued, or laminated to the inner layer 410. The midfoot linings 466a, 466b may be formed of any suitable material or combination of materials, including natural and manmade materials. In some cases, the midfoot linings 466a, 466b are formed of wool, nylon, and/or other materials that serve the functions discussed herein while being comfortable to a wearer of the shoe 100, including a wearer wearing the shoe without a sock.

Figure 5A:
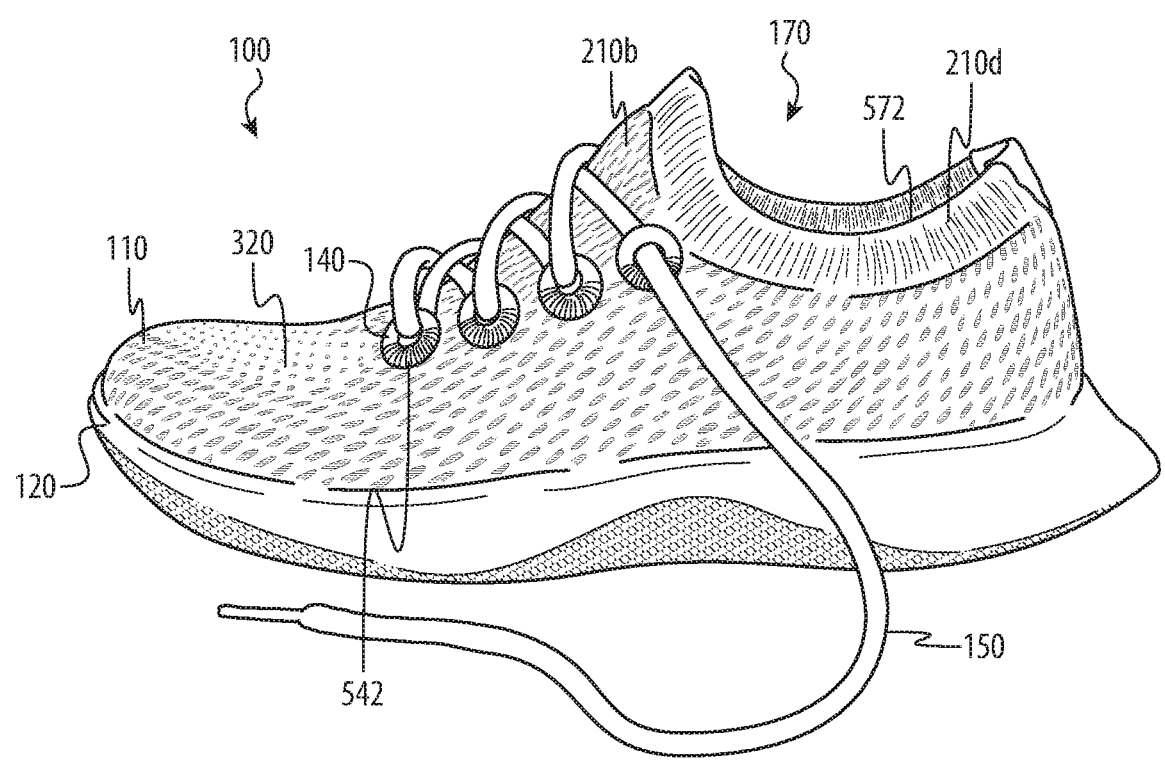
FIG. 5A illustrates a side view of the example shoe of FIG. 1.

FIG. 5A illustrates a side view of the example shoe 100. As shown in FIG. 5A, the shoe 100 may include eyelets 140 positioned externally to the upper portion 110 (e.g., along the exterior surface 320 of the upper portion 110). In some cases, each eyelet 140 is located completely outside of the upper portion 110. Said another way, no portion of each eyelet 140 is beneath any portion of the exterior surface 320 of the upper portion 110. Each eyelet 140 may be attached (e.g., sewn on) to the upper portion 110 using thread 542 that wraps around at least a portion of the eyelet and is stitched or otherwise attached to at least a portion of the upper portion 110. In some cases, the thread 542 is stitched into the outer layer of the upper portion 110. This allows the shoes to be manufactured without forming large holes in the upper portion 110, which may improve comfort and durability of the shoe. Sewing the eyelets 140 to the shoe 100 may additionally improve the ability to recycle the shoe by reducing the use of adhesives or other materials for attachment that may be harmful to the environment. Additionally or alternatively, the eyelets 140 may be attached to the upper portion 110 using any suitable technique, including adhesives, heat treatment, high frequency welding, and the like.

As discussed above, the shoe 100 may include a shoelace 150 passing through openings in the eyelets 140 to retain the shoe 100 to the wearer's foot. The shoelace 150 may extend across the flex region 210b and may be coupled to the upper portion 110 by passing through one or more eyelets 140 on either side of the flex region. As a result, tightening the shoelace 150 may draw the opposing eyelets 140 toward each other, thereby tightening the upper portion 110 on a wearer's foot. Similarly, loosening the shoelace 150 may draw the opposing eyelets 140 away from each other, thereby loosening the upper portion 110 on the wearer's foot.

The shoelace 150 may pull the eyelets 140 together, compressing the portions of the shoe 100 over the top of a wearer's foot (e.g., the flex region 210b) and putting the sides of the shoe (e.g., the peripheral region 210a) under strain or tension. This not only secures the shoe 100 to the wearer's foot but also provides extra tension to the body of the wearer, thereby supporting the wearer's foot during activities like walking, running, working out, and the like. In some cases, a flexibility of one or more layers of the upper portion 110 may enhance the ability for the shoe to support the wearer's foot. For example, an area over the wearer's foot may have more flexibility so that compression by the eyelets 140 and shoelace 150 may be more concentrated to the area over the wearer's foot to provide enhanced support and stability.

The eyelets 140 may be formed using any suitable material or combination of materials, including, but not limited, to, polyamides, polyethylene, polypropylene, polyurethane (e.g., thermoplastic polyurethane), and polyols. In some cases, the eyelets 140 may be formed at least partially from bio-based materials, including plant-based polymers, natural oil polyols, and the like. In some cases, the eyelets 140 may include a bio-based plastic made using castor oil. As noted above, using bio-based materials may provide environmental benefits, including reduced emissions and ecological sustainability.

In some cases, the eyelets 140 are formed from a polymer material (e.g., nylon). The polymer material may include a bio-based material, such as a polyol derived from castor oil. In some cases, bio-based materials may make up 60% or more of the polymer material. The eyelets 140 may be formed (e.g., molded, cut, etc.) into an annular ring shape having an opening through a central portion. The polymer material may be injection molded to form the eyelets 140. Dye may be added to the polymer material to color the eyelets 140. As noted above, the eyelets 140 may be sewn to the upper portion 110 using thread 542. This may allow for slight movement of the eyelet 140 relative to the upper portion 110, and may distribute the forces across each eyelet and the upper portion 110, thereby reducing the likelihood that the eyelets rip away from or through the upper.

As noted above, the shoelace 150 may extend through the eyelets 140 to secure the shoe 100 to a wearer's foot. In some cases, the shoelace 150 includes a tubular outer portion and an inner fill. The shoelace 150 may be formed using any suitable material or combination of materials, including polyester, nylon, cotton, and the like. In some cases, the outer portion and/or the inner fill are formed from recycled materials, such as recycled polyester from plastic bottles. As noted above, using recycled materials instead of new materials reduces waste sent to landfills and incinerators and conserves natural resources, prevents pollution, and saves energy related to the collection and processing of new raw materials.

As noted above, the upper portion 110 may define a cuff region 210d that may extend at least partially around a wearer's foot or ankle during use to help to secure the shoe 100 to the wearer's foot, which may improve the fit and comfort of the shoe, for example by reducing rubbing, shifting, or other problems associated with poor fit. The cuff region 210d may define a perimeter 572 of the opening 170 into the cavity 160. The upper portion 110 may include an elastic material in the cuff region 210d to increase the elasticity and/or flexibility of the cuff region 210d. The cuff region 210d may be formed from a knit elastic polymer (e.g., elastane) and one or more additional materials, such as recycled polyester.

Figure 5B:
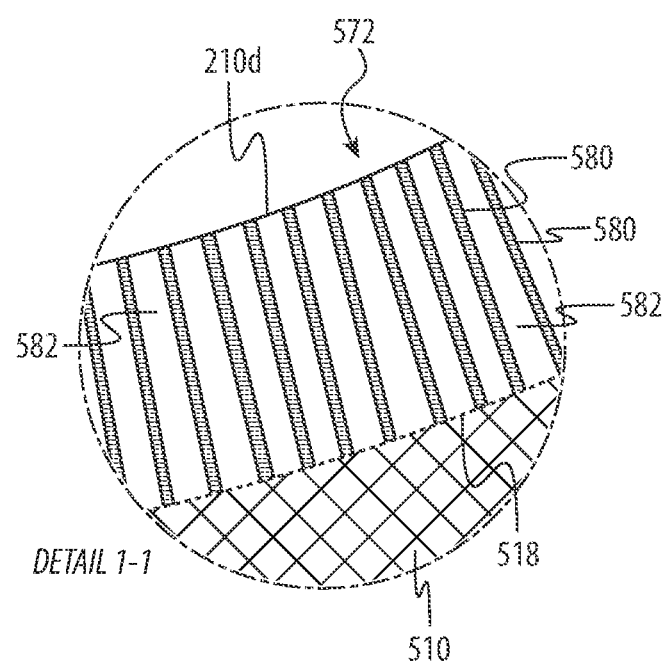
FIG. 5B illustrates a detail view of section 1-1 of FIG. 5A.

The cuff region 210d may be formed at least partially by a ribbed knit pattern that defines a set of ribs along one or more surfaces of the cuff region. FIG. 5B illustrates a detail view of section 1-1 of FIG. 5A. As shown in FIG. 5B, the cuff region 210d may include ribs 580 and depressions 582 between the ribs. The ribs 580 may be raised relative to the depressions 582. Likewise, the depressions 582 may be depressed relative to the ribs 580. In some cases, as shown in FIG. 5B, the ribs 580 extend from a boundary 518 between another region 510 of the upper portion 110 (e.g., the peripheral region 210a, the flex region 210b, etc.) and the cuff region 210d to the perimeter 572 of the opening 170. In some cases, some or all of the ribs 580 extend from the boundary 518 toward the perimeter 572, but do not reach the perimeter. In some cases, some of the ribs 580 extend all the way to the perimeter 572.

In various embodiments, the orientation of the ribs 580 (e.g., extending from the boundary 518 toward the perimeter 572) may provide advantages, including increasing a comfort of the shoe 100 on a wearer's foot. For example, the ribs 580 allow stretching in a transverse direction normal to the direction of the ribs (e.g., generally left and right with respect to FIG. 5B). The transverse stretching of the ribs 580 may avoid the cuff region 210d being too tight on a wearer's foot. The width of the cuff region 210d (e.g., the length of the ribs 580) may be sufficient to allow the cuff region to remain snug to secure the shoe 100 to the wearer's foot. The transverse stretching of the ribs 580 may provide or enhance the ability to adjust a size of the opening 170 to accommodate differently-sized feet (e.g., feet having different widths). Additionally, in some cases, the ribs 580 are substantially parallel to a majority of blood vessels in parts of a wearer's foot covered by the cuff region 210d, which reduces or avoids instances in which the ribs 580 cross over a blood vessel and potentially inhibit blood flow through the blood vessel. The ribs 580 may allow stretching in other directions besides the transverse direction normal to the direction of the ribs. For example, the ribs 580 may allow stretching in a direction parallel to the direction of the ribs (e.g., generally up and down with respect to FIG. 5B). This may provide numerous advantages, including increasing the comfort and support of the shoe 100.

In various embodiments, the width of the cuff region 210d (e.g., a distance from the perimeter 572 to the boundary 518 contributes to the comfort of the shoe 100. In some cases, the width of the cuff region 210d is greater than about one centimeter. In some cases, the width of the cuff region 210d is greater than about two centimeters. Similar to the ribs 580, the width of the cuff region may provide advantages, including increasing a comfort of the shoe 100 on a wearer's foot. For example, the cuff region 210d may apply a sufficient elastic force to the wearer's foot to secure the shoe 100 to the wearer's foot, while the width of the cuff region distributes this elastic force across a great enough area to avoid discomfort to the wearer, such as deforming the wearer's skin, inhibiting circulation, and the like.

In some cases, the ribs 580 and the depressions 582 are formed by knit fibers. In various embodiments, the ribs 580 and the depressions 582 may be formed by a knit pattern, such as a 1×1 ribbed pattern, a 2×2 ribbed pattern, or the like. FIG. 5B illustrates example shapes and arrangements of ribs 580 and depressions 582. In various embodiments, the particular shapes and details of the ribs 580 and the depressions 582 may vary from what is shown in FIG. 5B. For example, the ribs 580 and/or the depressions 582 may include variations in texture or shape as a result of being formed from knit fibers. In some cases, the cuff region 210d includes different or additional features, such as dimples.

Figure 6:
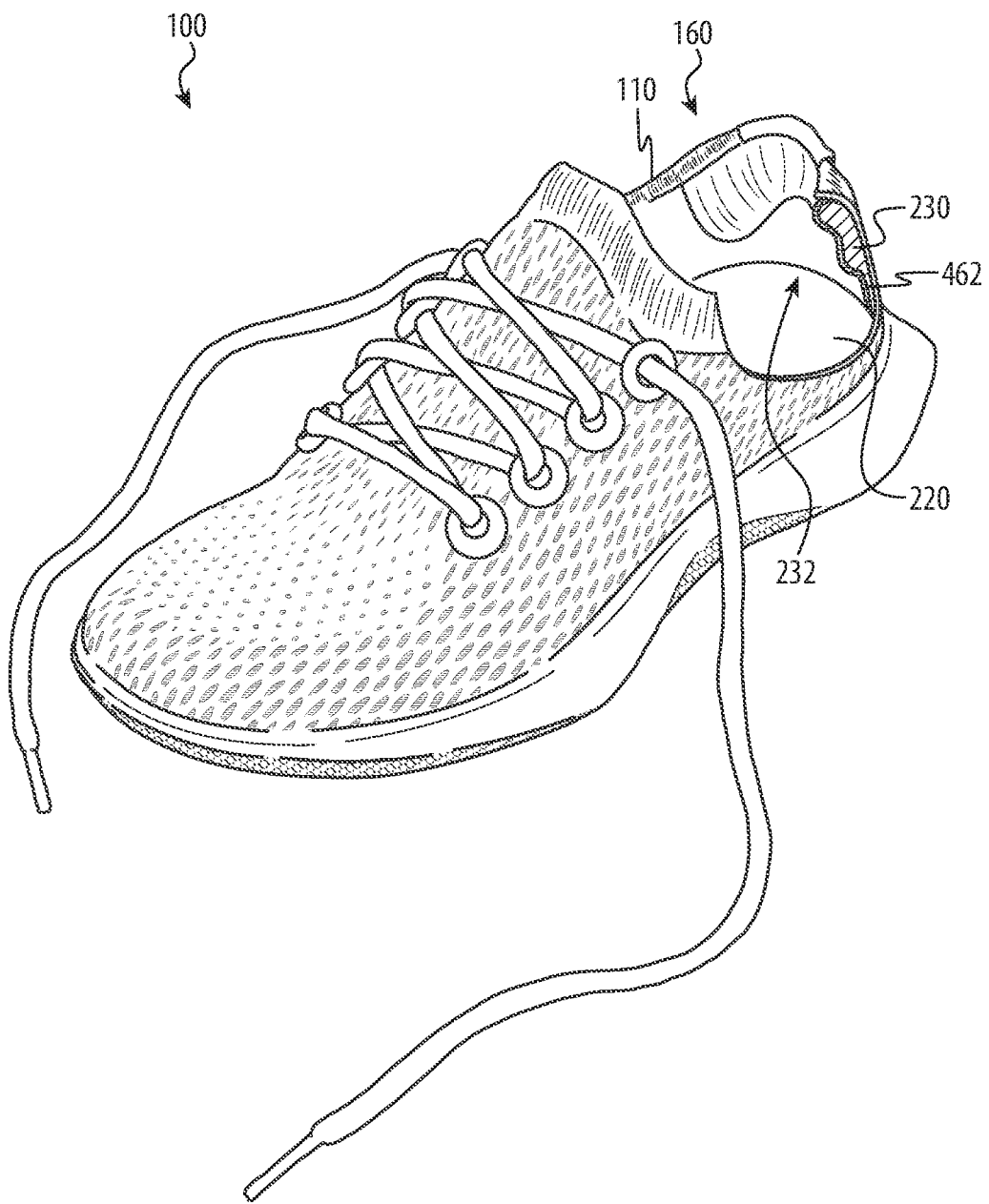
FIG. 6 illustrates a partial cutaway view of the example shoe of FIG. 1.

As discussed above, the shoe 100 may include a heel retainer 230 to improve comfort and performance of the shoe. FIG. 6 illustrates a partial cutaway view of the example shoe 100, including a heel retainer 230. As shown in FIG. 6, the heel retainer 230 may be positioned along or define an interior surface of the upper portion 110, and may protrude into the cavity 160. The heel retainer 230 may define a recess 232 between the heel retainer 230 and the insole 220. The recess and the heel retainer 230 may conform to a shape of a wearer's foot (e.g., the wearer's heel and/or heel bone) to retain the wearer's foot in the cavity 160 and/or minimize the wearer's foot sliding or rubbing against the interior surface of the upper portion 110. Put another way, the wearer's heel can fit below the heel retainer 230, such that the heel retainer holds the heel in place or reduces heel motion when the wearer runs or engages in strenuous athletic activity.

The heel retainer 230 may be formed, at least in part, by placing bio-based and/or synthetic padding material between layers and/or components of the upper portion 110. In some cases, the padding for the heel retainer 230 may include a polyurethane foam. In some cases, the heel retainer 230 is formed, at least in part, by placing bio-based and/or synthetic padding material between the upper portion 110 and a lining of the shoe 100. The heel retainer 230 may be formed, at least in part, as a result of one or more layers of the upper portion 110 or linings of the shoe 100 having an increased thickness compared to other regions of the upper portion 110 or lining.

The heel retainer 230 may cooperate with one or more additional components of the shoe 100 to improve shoe performance and comfort, including the cuff region 210d. The cuff region 210d may exert an elastic force that draws the heel retainer 230 against the wearer's foot to more effectively retain the shoe 100 on the wearer's foot. The heel retainer 230 may increase a comfort of the shoe 100 by providing padding between the cuff region 210d and sensitive portions of the wearer's foot or leg, including the areas around the Achilles tendon. This may avoid or reduce discomfort to the wearer resulting from the cuff region 210d exerting an elastic force on the wearer.

Figure 7:
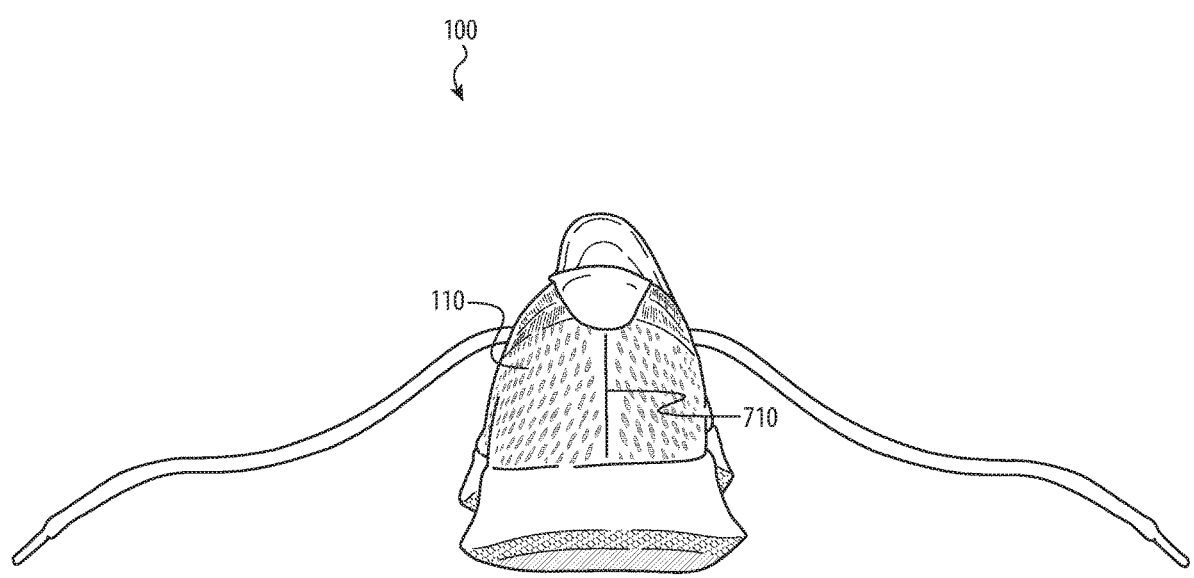
FIG. 7 illustrates a rear view of the example shoe of FIG. 1.

In various embodiments, the shoe 100 may be assembled by attaching the eyelets 140 to the upper portion 110 and forming the upper portion 110 into a desired three-dimensional shape, for example using a mold. The upper portion 110 may be attached to itself at a seam to hold the shape of the upper portion 110 and construct the shoe 100. FIG. 7 illustrates a rear view of the example shoe 100 showing the upper portion 110 attached to itself at a seam 710. The upper portion 110 may be attached to itself using any suitable fastening technique, including adhesives, stitching, bonding, and the like.

Figure 8:
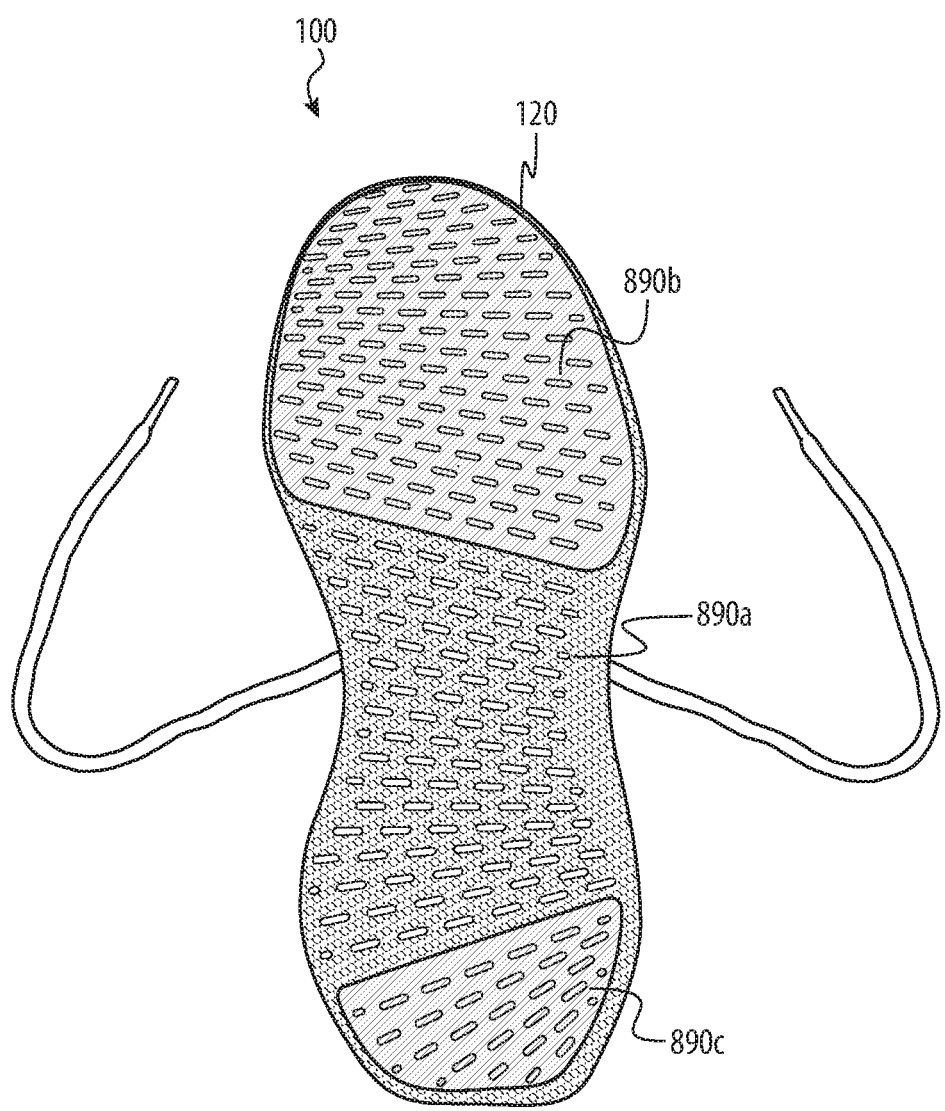
FIG. 8 illustrates a bottom view of the example shoe of FIG. 1.

The sole 120 may define one or more tread surfaces that are adapted to contact the ground or other surfaces while the shoe is worn. FIG. 8 illustrates a bottom view of the example shoe 100 showing example tread surfaces 890a-c on the sole 120. The tread surfaces 890a-c may include one or more patterns or features to improve the traction of the shoe 100. In some cases, the tread surfaces 890a-c include indentations and/or protrusions that define the patterns or features for improving traction.

The sole 120 may include different sections that have different properties and characteristics, including traction and flexibility. The portion of the sole 120 that defines the tread surface 890a may be more flexible than one or more additional portions of the sole to allow the sole to bend or otherwise deform as a wearer walks or otherwise moves. The portions of the sole 120 that define the tread surfaces 890b and 890c may be formed of a material and/or have different texture(s) that provide greater traction than other portions of the sole 120.

In various embodiments, the sole 120 may be formed of any suitable material or combination of materials, including polyamides, polyethylene, polypropylene, polyurethane (e.g., thermoplastic polyurethane), polyols, natural and synthetic rubbers, and the like. In some cases, the sole 120 is formed at least partially from bio-based material(s), such as castor bean oil. In some cases, the sole 120 include natural and synthetic rubber. As noted above, using bio-based materials may provide environmental benefits, including reduced emissions and ecological sustainability.

As noted above, many embodiments described herein reference a shoe having a knit upper portion. It may be appreciated, however, that this is merely one example; other configurations, implementations, and constructions are contemplated in view of the various principles and methods of operations—and reasonable alternatives thereto—described in reference to the embodiments described above.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A shoe, comprising:
a sole defining a tread surface and a top surface opposite the tread surface; and
an upper portion attached to the top surface of the sole and cooperating with one or more additional components of the shoe to define a cavity, the upper portion including a continuous knit textile comprising:
a cuff region at least partially surrounding an opening into the cavity and defining at least a portion of a first perimeter at the opening, the cuff region having a first elasticity defined at least in part by a first knit pattern comprising a first thickness of a first yarn blend;
a flex region having a second elasticity defined at least in part by a second knit pattern comprising a second thickness of a second yarn blend, the flex region and the cuff region configured to stretch to increase a size of the opening;
a toe region having a third elasticity defined at least in part by a third knit pattern comprising a third thickness of a third yarn blend, the third elasticity less than the first elasticity and the second elasticity; and
a peripheral region defining at least a portion of a second perimeter at a junction between the upper and the sole and at least partially surrounding the cuff region, the flex region, and the toe region, the peripheral region having a fourth elasticity derived at least in part by a fourth knit pattern comprising a fourth thickness of a fourth yarn blend, the fourth elasticity that is less than the first elasticity and the second elasticity;
wherein:
the flex region is configured to pull the peripheral region against a wearer's foot to provide enhanced structural stability;
the fourth thickness is greater than the first, second, and third thickness;
an exterior surface of the upper portion defined by the second knit pattern, third knit pattern, and fourth knit pattern forms the continuous knit textile which defines a seamless transition between the toe region and surrounding portions of the flex region and the peripheral region;
the continuous knit textile comprises eucalyptus fiber;
each the second yarn blend, the third yarn blend, and the fourth yarn blend including a yarn comprising from 60% to 80% of the eucalyptus fiber; and
the flex region, a shoelace, a first set of eyelets, and a second set of eyelets are configured to cooperate to tighten the shoe around a wearer's foot.

2. The shoe of claim 1, wherein:
the shoe further comprises:
an insole positioned in the cavity; and
a heel retainer positioned along an interior surface of the upper portion and defining a recess between the heel retainer and the insole; and
the heel retainer and the cuff region are configured to retain the wearer's foot in the cavity.

3. The shoe of claim 1, wherein:
each the first set of eyelets and the second set of eyelets include one or more eyelets positioned externally to the upper portion; and
the shoelace extends through the one or more eyelets of each the first and second set of eyelets.

4. The shoe of claim 3, wherein:
the first set of eyelets is along a first side of the flex region; and
the second set of eyelets is along a second side of the flex region opposite the first side.

5. The shoe of claim 1, wherein:
the upper portion further comprises a reinforcement component positioned along an interior surface of the peripheral region and at least partially surrounding the toe region.

6. The shoe of claim 1, wherein the continuous knit textile comprises:
an outer layer defining at least a portion of an exterior surface of the upper portion; and
an inner layer defining at least a portion of an interior surface of the upper portion.

7. The shoe of claim 6, wherein each of the outer layer and the inner layer extend along an entirety of the upper portion.

8. The shoe of claim 1, wherein:
the peripheral region further comprises a thermoplastic material bonded to the eucalyptus fiber; and
the toe region is free of the thermoplastic material.

9. The shoe of claim 8, wherein the flex region further comprises elastane.

10. A shoe, comprising:
a sole defining a tread surface;
a knit upper portion attached to the sole and defining a cavity, the knit upper portion comprising:
a cuff region surrounding an opening into the cavity and defining at least a portion of a perimeter of the opening, the cuff region having a first elasticity defined at least in part by a first knit pattern comprising a first thickness of a first yarn blend, the first yarn blend comprising an elastic material;
a flex region having a second elasticity defined at least in part by a second knit pattern comprising a second thickness of a second yarn blend;
a toe region having a third elasticity defined at least in part by a third knit pattern comprising a third thickness of a third yarn blend, the third elasticity less than the first elasticity and the second elasticity; and
a peripheral region having a fourth elasticity defined at least in part by a fourth knit pattern comprising a fourth thickness of a fourth yarn blend, the fourth elasticity less than the first elasticity and the second elasticity, wherein:
the fourth thickness is greater than the first, second, and third thickness;
a heel liner extending along a rear portion of an interior surface of the knit upper portion; and
a heel retainer defined by a first portion of the heel liner and heel padding positioned between the first portion of the heel liner and the interior surface of the knit upper portion, the heel retainer configured to conform to a wearer and protruding into the cavity and beyond a second portion of the heel liner positioned below the first portion of the heel liner, the shoe having a greater thickness at the heel retainer than at the second portion of the heel liner; wherein:

the cuff region is configured to exert an elastic force that draws the heel retainer against the wearer to retain the shoe on the wearer; and the knit upper portion is knit as a single, unitary piece, an external surface of the knit upper portion is defined by the second knit pattern, the third knit pattern, and the fourth knit pattern which defines a seamless transition between the toe region and surrounding portions of the flex region and the peripheral region, each the second yarn blend, the third yarn blend, and the fourth yarn blend including yarn comprising from 60% to 80% of a eucalyptus fiber; and the flex region, a shoelace, and a set of eyelets are configured to cooperate to tighten the shoe around a wearer's foot.

11. The shoe of claim 10, wherein:

the shoe further comprises an insole positioned in the cavity;

the second portion of the heel liner is positioned between the heel retainer and the insole;

the heel retainer and the second portion of the heel liner cooperate to define a recess below the heel retainer and above the insole; and the recess is configured to conform to the wearer.

12. The shoe of claim 10, wherein the knit upper portion further comprises:

a peripheral region at least partially surrounding the cuff region, the fourth yarn blend not comprising the elastic material;

a flex region at least partially surrounded by the peripheral region, the second yarn blend comprising the elastic material; and the toe region surrounded by the peripheral region and the flex region.

13. The shoe of claim 12, wherein the first knit pattern comprises a set of ribs, each rib of the set of ribs extending from the perimeter of the opening to at least one of a first boundary between the cuff region and the peripheral region or a second boundary between the cuff region and the flex region.

14. The shoe of claim 12, wherein:

the knit upper portion defines a boundary between the cuff region and the peripheral region; and a distance between the perimeter of the opening and the boundary is greater than 1 centimeter.

15. The shoe of claim 14, wherein the knit upper portion comprises:

an outer layer defining a first surface of the knit upper portion; and an inner layer defining a second surface of the knit upper portion opposite the first surface.

16. A shoe, comprising:

a sole comprising a bio-based foam material;

an upper portion attached to the sole, at least partially defining a cavity, and comprising:

a toe region having a first stiffness defined at least in part by a first knit pattern comprising a first thickness of a first yarn blend, the first yarn blend comprising a eucalyptus fiber;

a peripheral region extending around at least a portion of a perimeter of the upper portion at a junction between the upper portion and the sole, having a second stiffness defined at least in part by a second knit pattern comprising a second thickness of a second yarn blend, wherein:

the second stiffness is greater than the first stiffness;

the second yarn blend comprises the eucalyptus fiber; and the second thickness is greater than the first thickness; and a flex region at least partially surrounded by the peripheral region, cooperating with the peripheral region to surround the toe region, and having a third stiffness defined at least in part by a third knit pattern comprising a third thickness of a third yarn blend, the third yarn blend comprising the eucalyptus fiber and an elastic material, wherein:

the third elasticity is less than the first elasticity and the second elasticity; and the third thickness is less than the second thickness;

a first set of eyelets positioned along an exterior surface of the upper portion on a first side of the flex region;

a second set of eyelets positioned along the exterior surface of the upper portion on a second side of the flex region opposite the first side; and a shoelace extending through one or more eyelets of the first set of eyelets and one or more eyelets of the second set of eyelets; wherein:

the exterior surface of the upper portion is defined by the first knit pattern, the second knit pattern, and the third knit pattern to form a continuous knit textile which defines a seamless transition between the toe region and surrounding portions of the flex region and the peripheral region, each the first yarn blend, the second yarn blend, and the third yarn blend including a yarn comprising from 60% to 80% of the eucalyptus fiber; and the flex region, the shoelace, the first set of eyelets, and the second set of eyelets are configured to cooperate to tighten the shoe around a wearer's foot.

17. The shoe of claim 16, wherein:

the second yarn blend does not include the elastic material; and a density of the first knit pattern is less than a density of the second knit pattern.

18. The shoe of claim 16, wherein the upper portion further comprises a cuff region surrounding an opening into the cavity and comprising the elastic material, the cuff region configured to cooperate with the flex region, the shoelace, the first set of eyelets, and the second set of eyelets to tighten the shoe around the wearer's foot.

19. The shoe of claim 16, wherein the shoe further comprises a heel retainer positioned along an interior surface of the upper portion and extending into the cavity, the heel retainer configured to cooperate with the flex region, the shoelace, the first set of eyelets, and the second set of eyelets to tighten the shoe around the wearer's foot.

* * * * *